United States Patent
Kelford

(10) Patent No.: US 10,767,597 B2
(45) Date of Patent: Sep. 8, 2020

(54) COLLAPSIBLE DRAG LINK

(71) Applicant: ROHR, INC., Chula Vista, CA (US)

(72) Inventor: Bryce Tyler Kelford, San Diego, CA (US)

(73) Assignee: ROHR, INC., Chula Vista, CA (US)

( * ) Notice: Subject to any disclaimer, the term of this patent is extended or adjusted under 35 U.S.C. 154(b) by 254 days.

(21) Appl. No.: 16/022,029

(22) Filed: Jun. 28, 2018

(65) Prior Publication Data

US 2020/0003155 A1   Jan. 2, 2020

(51) Int. Cl.
*F02K 1/76* (2006.01)
*F02K 1/72* (2006.01)

(52) U.S. Cl.
CPC ............ *F02K 1/763* (2013.01); *F02K 1/72* (2013.01); *F05D 2230/60* (2013.01); *F05D 2260/52* (2013.01)

(58) Field of Classification Search
CPC . F02K 1/763; F02K 1/566; F02K 1/62; F02K 1/70; F02K 1/72; F05D 2230/60; F05D 2260/52
See application file for complete search history.

(56) References Cited

U.S. PATENT DOCUMENTS

| | | | | |
|---|---|---|---|---|
| 3,380,662 A | * | 4/1968 | Miller | F02K 1/62 239/265.37 |
| 3,612,209 A | * | 10/1971 | Vdoviak | F02K 1/1269 60/232 |
| 6,079,201 A | * | 6/2000 | Jean | F02K 1/70 239/265.29 |
| 9,127,623 B2 | | 9/2015 | Peyron | |
| 9,255,547 B2 | | 2/2016 | Beardsley | |
| 2004/0195443 A1 | * | 10/2004 | Lair | F02K 1/70 244/110 B |
| 2014/0353399 A1 | * | 12/2014 | Stuart | F02K 1/72 239/11 |
| 2015/0176528 A1 | | 6/2015 | Peyron | |
| 2016/0160799 A1 | * | 6/2016 | Gormley | F02K 1/763 239/265.19 |

FOREIGN PATENT DOCUMENTS

| | | |
|---|---|---|
| EP | 2921686 | 9/2015 |
| WO | 2014084986 | 6/2014 |

OTHER PUBLICATIONS

European Patent Office, European Search Report dated Nov. 19, 2019 in Application No. 19172086.1.

* cited by examiner

*Primary Examiner* — Carlos A Rivera
(74) *Attorney, Agent, or Firm* — Snell & Wilmer L.L.P.

(57) ABSTRACT

A thrust reverser system of a nacelle is provided. The thrust reverser system may include a pressure shell, a blocker door, and a drag link. The blocker door may be pivotably coupled to the pressure shell. The drag link may include a first segment pivotably coupled to a second segment and a third segment pivotably coupled to the second segment and the blocker door.

20 Claims, 10 Drawing Sheets

COLLAPSIBLE DRAG LINK

FIELD

The present disclosure relates to thrust reversers for aircraft propulsion systems and, more particularly, to drag links of thrust reversers.

BACKGROUND

Gas turbine engine systems for modern aircraft often include a thrust reverser incorporated into a nacelle. The thrust reverser may redirect the flow of air through the nacelle in order to apply a reverse thrust to the aircraft. One style of thrust reverser includes a translating sleeve. The translating sleeve may translate aft to deploy blocker doors into the bypass air duct of a nacelle. The blocker doors may redirect air in the bypass air duct outward though a series of cascades which then turn the air forward, producing reverse thrust. The blocker doors may be hinged to the translating sleeve and may be coupled to the inner fixed structure via a drag link. As the translating sleeve translates aft, the drag link may pull the blocker doors inward, pivoting them into the bypass air duct. Connecting the drag link to a translating sleeve and a stationary body may present challenges since each body responds differently to structural flight loads. Furthermore, the presence of the drag link in the airflow of the inner duct creates aerodynamic drag and a decrement to aircraft performance.

SUMMARY

According to various embodiments, a thrust reverser system is described herein. The thrust reverser system may include a pressure shell, a blocker door, and a drag link. The blocker door may be pivotably coupled to the pressure shell. The drag link may include a first segment pivotably coupled to a second segment and a third segment pivotably coupled to the second segment and the blocker. According to various embodiments, a first end of the second segment may be coupled with a second end of the first segment, and wherein a second end of the second segment is coupled with a first end of the third segment. According to various embodiments, a first end of the first segment may be coupled to an outer fixed structure of the thrust reverser system. According to various embodiments, first segment may have a first width greater than a second width of the second segment. According to various embodiments, the second width of the second segment may be greater than a third width of the third segment. According to various embodiments, a second end of the third segment may be coupled to an aft end of the blocker door. According to various embodiments, the blocker door may include a trench defined at least partially by a first sidewall, a second sidewall, and a joining wall disposed between the first sidewall and second sidewall. According to various embodiments, the first segment and the second segment may be coupled via first torsional spring. According to various embodiments, the second segment and the third segment may be coupled via a second torsional spring.

According to various embodiments, a nacelle having a thrust reverser is described herein. The nacelle may include a pressure shell, a blocker door, and a drag link. The blocker door may be pivotably coupled to the pressure shell. The drag link may include a first segment pivotably coupled to a second segment and a third segment pivotably coupled to the second segment and the blocker. According to various embodiments, a first end of the second segment may be coupled with a second end of the first segment, and wherein a second end of the second segment is coupled with a first end of the third segment. According to various embodiments, a first end of the first segment may be coupled to an outer fixed structure of the thrust reverser system. According to various embodiments, the first segment may have a first width greater than a second width of the second segment. According to various embodiments, the second width of the second segment may be greater than a third width of the third segment. According to various embodiments, a second end of the third segment may be coupled to an aft end of the blocker door. According to various embodiments, blocker door may include a trench defined at least partially by a first sidewall, a second sidewall, and a joining wall disposed between the first sidewall and second sidewall. According to various embodiments, the first segment and the second segment may be coupled via first torsional spring. According to various embodiments, the second segment and the third segment may be coupled via a second torsional spring.

According to various embodiments, a method of manufacturing a drag link for use in a thrust reverser of a nacelle is provided. The method may include coupling a second end of a first segment to a first end of a second segment. The method may include coupling a second end of the second segment to a first end of a third segment. The method may include coupling a second end of the third segment to a blocker door. In various embodiments, the method may include coupling a first end of the first segment to an outer fixed structure. In various embodiments, the method may include coupling a forward end of the blocker door to a pressure shell.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements.

DETAILED DESCRIPTION

The detailed description of various embodiments herein makes reference to the accompanying drawings, which show various embodiments by way of illustration. While these various embodiments are described in sufficient detail to enable those skilled in the art to practice the disclosure, it should be understood that other embodiments may be realized and that logical, chemical, electrical, and mechanical changes may be made without departing from the spirit and scope of the disclosure. Thus, the detailed description herein is presented for purposes of illustration only and not of limitation.

For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected, or the like may include permanent, removable, temporary, partial, full, and/or any other possible attachment option. Additionally, any reference to without contact (or similar phrases) may also include reduced contact or minimal contact.

For example, in the context of the present disclosure, methods, systems, and articles may find particular use in connection with aircraft braking systems. However, various aspects of the disclosed embodiments may be adapted for performance in a variety of other systems. As such, numerous applications of the present disclosure may be realized.

A thrust reverser system in a gas turbine engine may comprise a cascade element, a translating sleeve of a nacelle (e.g., moveable element), and a blocker door. The cascade elements may be coupled to an outer fixed structure of the nacelle. In response to the translating sleeve being moved to an aft position (e.g., the position corresponding to the thrust reverser being deployed), the cascade element may move aft. When deploying, a drag link system coupled to the outer fixed structure and an aft portion of the blocker door may force the blocker door to pivot about a forward portion of the blocker door and block air flow from the bypass duct, diverting the air flow into the cascade element. The cascade assembly may direct fan air flow diverted by the blocker door while the thrust reverser is deployed (e.g., during landing or any other suitable aircraft slow down event).

Figure 1:
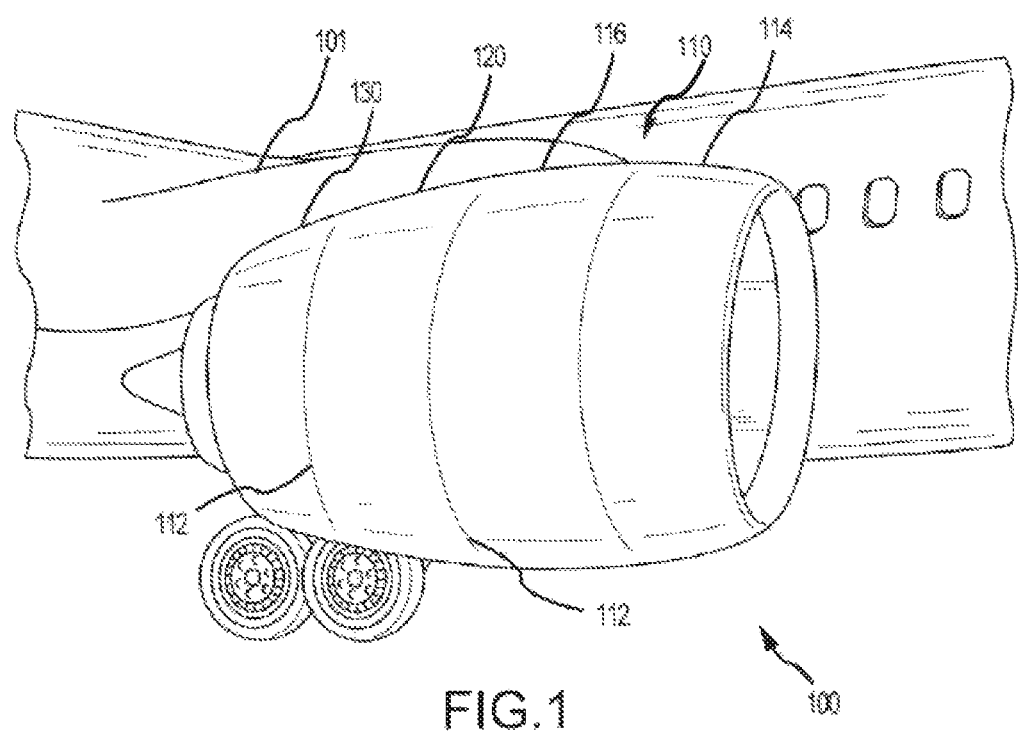
FIG. 1 illustrates a perspective view of a nacelle in accordance with various embodiments.

Referring to FIG. 1, an exterior view of a nacelle 100 is shown in the stowed position (e.g., with the thrust reverser inactive and nacelle 100 closed). A propulsion system for a commercial jetliner may include a pylon 101, and a nacelle 100 surrounding an engine. The nacelle 100 surrounds the engine providing smooth aerodynamic surfaces for airflow around and into the engine. The nacelle 100 also helps define a bypass duct through the propulsion system.

A fan draws and directs a flow of air into and through the propulsion system. After the fan, the air is divided into two flowpaths, one flowpath through the engine core, and another flowpath through a bypass duct. The flow of air into the engine core flowpath passes first through a compressor that increases the pressure, and then through a combustor where the compressed air is mixed with fuel and ignited. The combustion of the fuel and air mixture causes a series of turbine blades at the rear of the engine core to rotate and in turn to drive the engine's compressor and fan. The fuel and air mixture may then be directed through an exhaust nozzle at the rear of the engine at high speed for thrust.

Air in the bypass flowpath is drawn in by the fan and then directed around the engine core in a duct or ducts defined by the nacelle 100. The bypass air exits the duct through a nozzle at the rear of the propulsion system to provide thrust. In turbofan propulsion systems, the bypass flow typically provides a large portion of the thrust. A thrust reverser may selectively block bypass air in the bypass duct from reaching the nozzle, and instead redirect the bypass air to exit the duct in a forward or substantially forward direction of the aircraft to generate reverse thrust.

Nacelle 100 may comprise a fixed forward portion 110, a translating sleeve 120, and a fixed aft portion 130. The translating sleeve 120 may be located between the fixed forward portion 110 and the fixed aft portion 130. Split lines 112 identify the separation points or planes of translating sleeve 120 from fixed forward portion 110 and fixed aft portion 130 of the nacelle 100. Fixed forward portion 110 may comprise an inlet 114 and a fan cowl 116 of the nacelle 100. In various embodiments, fan cowl 116 may be configured to hinge open in order to provide access within nacelle 100.

Figure 2:
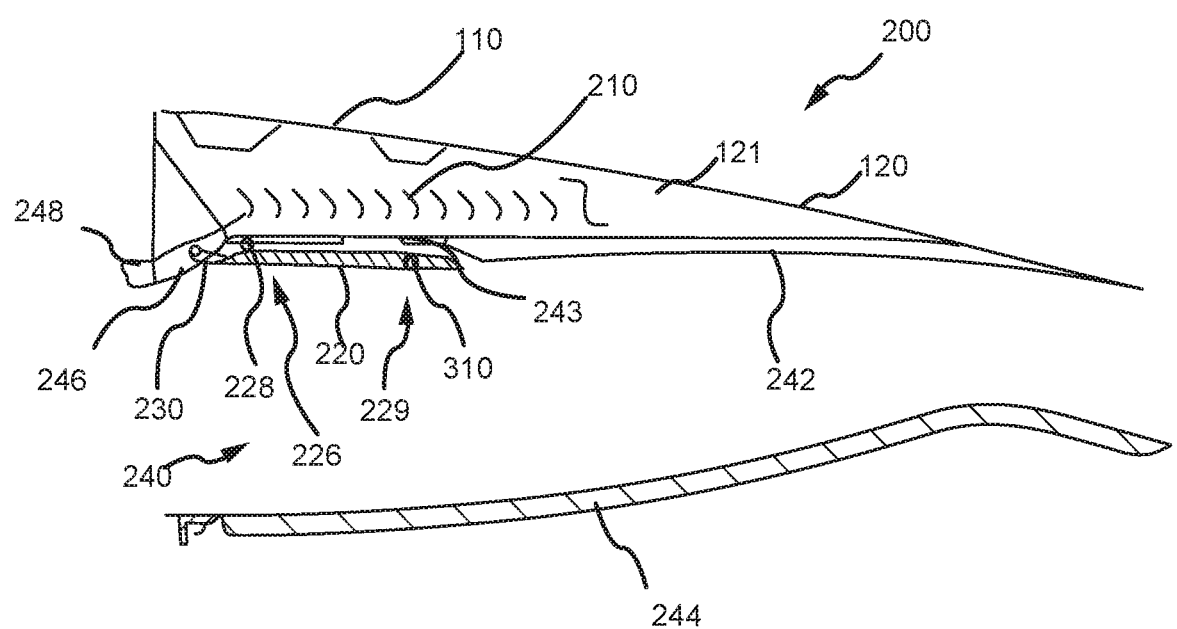
FIG. 2 illustrates a cross section of a thrust reverser of the nacelle in accordance with various embodiments.

Referring to FIG. 2, a cross-section view of a thrust reverser system 200 in the stowed position is illustrated according to various embodiments. Thrust reverser system 200 may be located within nacelle 100 shown in FIG. 1. Thrust reverser system 200 may comprise a cascade 210, a blocker door 220, a drag link system 230, and a bypass duct 240. Bypass duct 240 may be defined by inner panel 242 and internal fixed structure ("IFS") 244. Inner panel 242 may comprise pressure shell 243.

In the stowed position (e.g. when nacelle 100 is closed as shown in FIGS. 1 and 2), cascade 210 may be stowed within cavity 121 of translating sleeve 120. Cascade 210 may be stowed in any portion of nacelle 100. In various embodiments, cascade 210 may be coupled to, attached to, fixed to, mounted to, or otherwise supported by fixed to outer fixed structure 246. Thrust reverser system 200 may comprise a plurality of cascades 210 which form an annular ring within fixed forward portion 110.

Blocker door 220 may be coupled with pressure shell 243. Blocker door 220 may be configured to block bypass duct 240 as further described with reference to FIG. 5. A forward end 226 of blocker door 220 may be pivotably coupled to pressure shell 243 at hinge 228. Blocker door 220 may be configured to pivot about hinge 228. An aft portion 229 of blocker door 220 may be coupled to drag link system 230 via cross member 310. Drag link system 230 may be nested within blocker door 200 while thrust reverser system 200 is in the stowed position.

Figure 3:
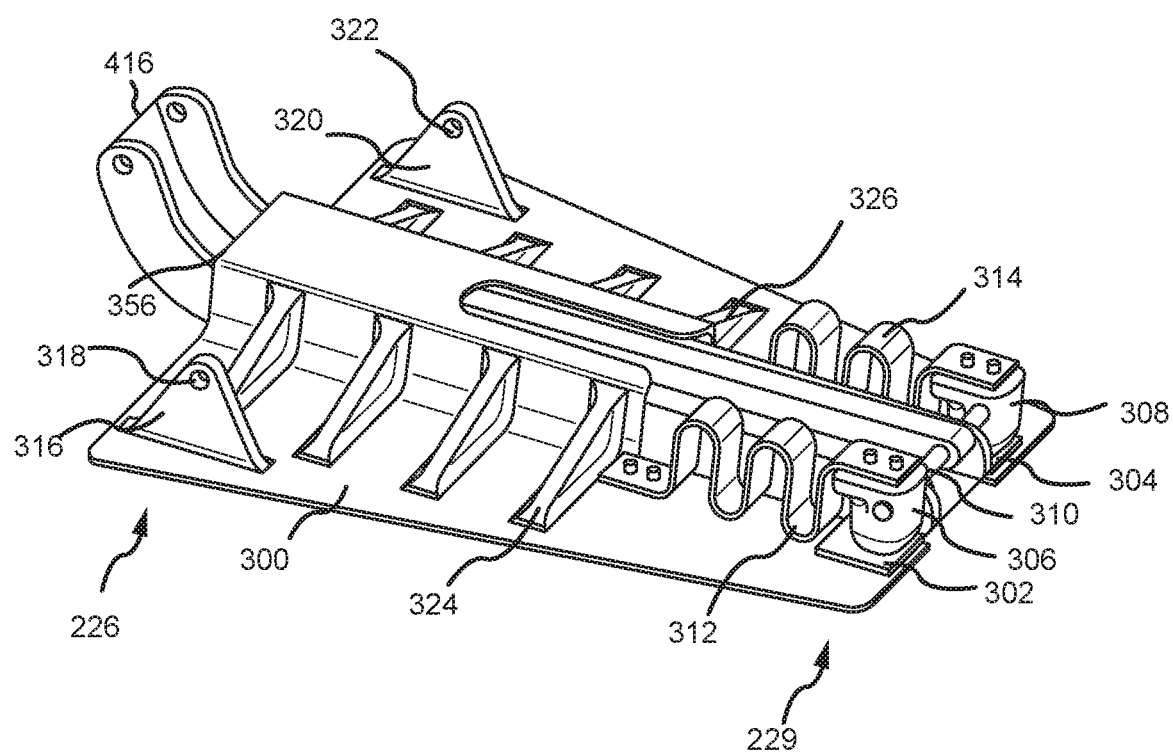
FIG. 3 illustrates a blocker door and drag link system in accordance with various embodiments.
Figure 4:
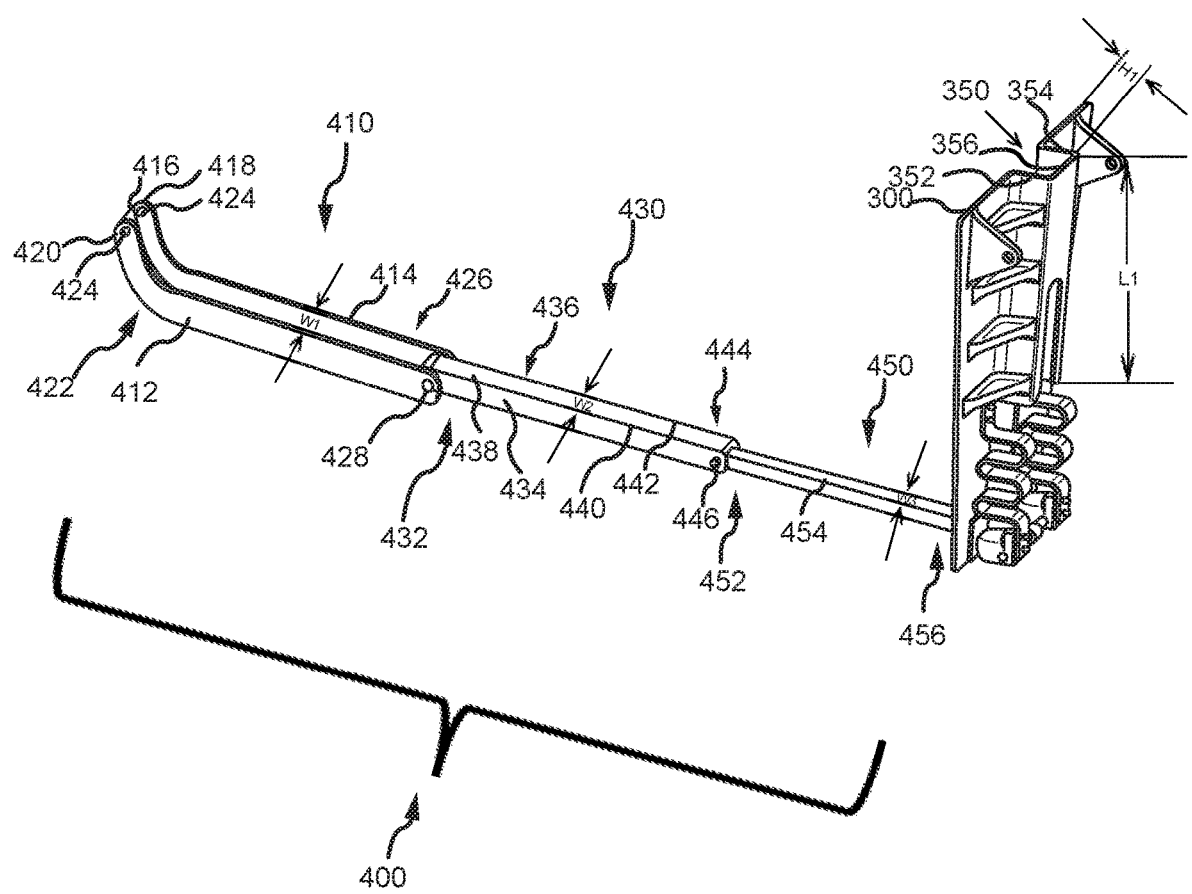
FIG. 4 illustrates a blocker door and drag link system in accordance with various embodiments.

With reference to FIG. 3 and FIG. 4, blocker door 220 is illustrated according to various embodiments. Blocker door 220 comprises forward end 226 and aft end 229.

Aft end 229 of blocker door 220 may comprise first contact patch 302 and second contact patch 304 coupled with surface 300. First beam 306 may be coupled with first contact patch 302. Second beam 308 may be coupled with second contact patch 304. Cross member 310 may extend between and be coupled with first beam 306 and second beam 308.

Spring 312 may be coupled to surface 300 of blocker door 220 at a first end and first beam 306 at a second end. Spring 314 may be coupled to surface 300 of blocker door 220 at one end and second beam at a second end. Springs 312, 314 may create preload and pre-stress in this door to ensure that the blocker door 220 tends not to vibrate or translate when stowed in a non-deployed state.

Blocker door 220 may comprise a first tab 316 coupled with and extending from forward end 226 of surface 300. First tab 316 may comprise aperture 318 configured to be pivotably coupled to pressure shell 243. Blocker door 220 may comprise a second tab 320 coupled with and extending from forward end 226 of surface 300. Second tab 320 may comprise aperture 322 configured to be pivotably coupled to pressure shell 243.

Blocker door 220 may comprise trench 350 extending from surface 300 at forward end 226 of blocker door 220, in accordance with various embodiments. Trench 350 may be a recess extending aft from forward end 226.

Trench 350 may comprise first sidewall 352 and second sidewall 354. First sidewall 352 and second sidewall 354 may extend from and be substantially perpendicular to surface 300. First sidewall 352 and second sidewall 354 may comprise a concave or convex geometry. Joining wall 356 may be disposed between and coupled with first sidewall 352 and second sidewall 354. Joining wall 356 may extend a length $L_1$ in an axial direction and may have a height $H_1$ from surface 300.

Blocker door 220 may comprise a support structure 324 and a support structure 326. Support structure 324 may be coupled with surface 300 and first sidewall 352. Support structure 326 may be coupled with surface 300 and second sidewall 354. Blocker door 220 may comprise a plurality of support structures 324 and support structures 326.

Figure 5:
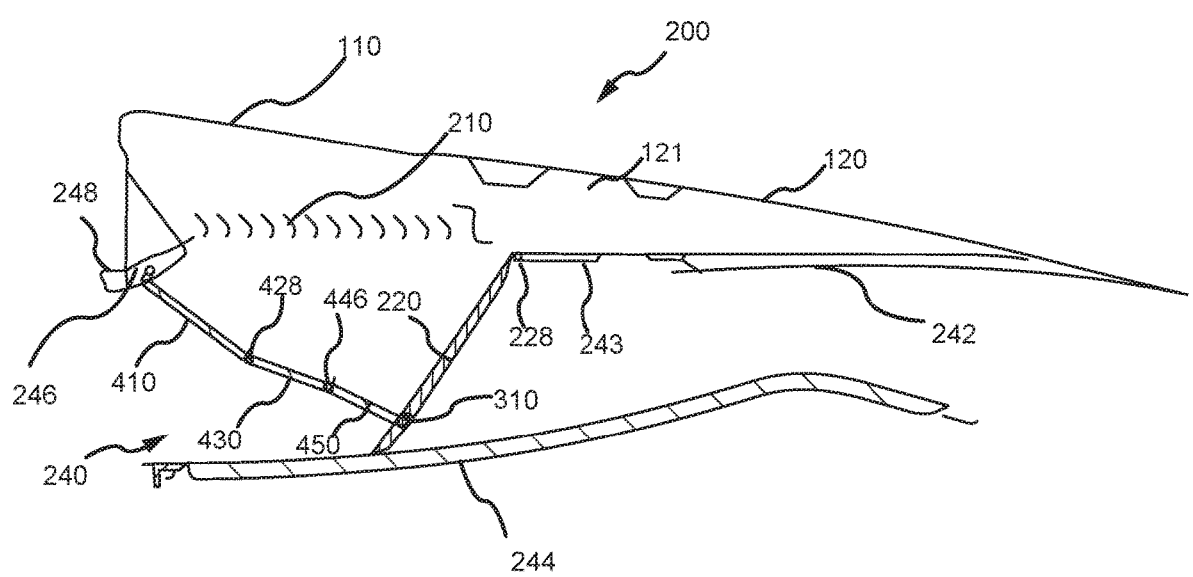
FIG. 5 illustrates a cross section of the thrust reverser in accordance with various embodiments.
Figure 6A:
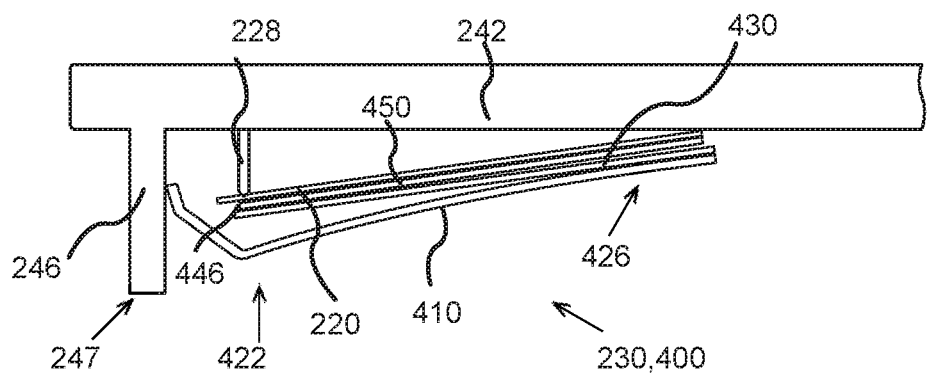
FIG. 6A illustrates a cross section of the thrust reverser in accordance with various embodiments.
Figure 6B:
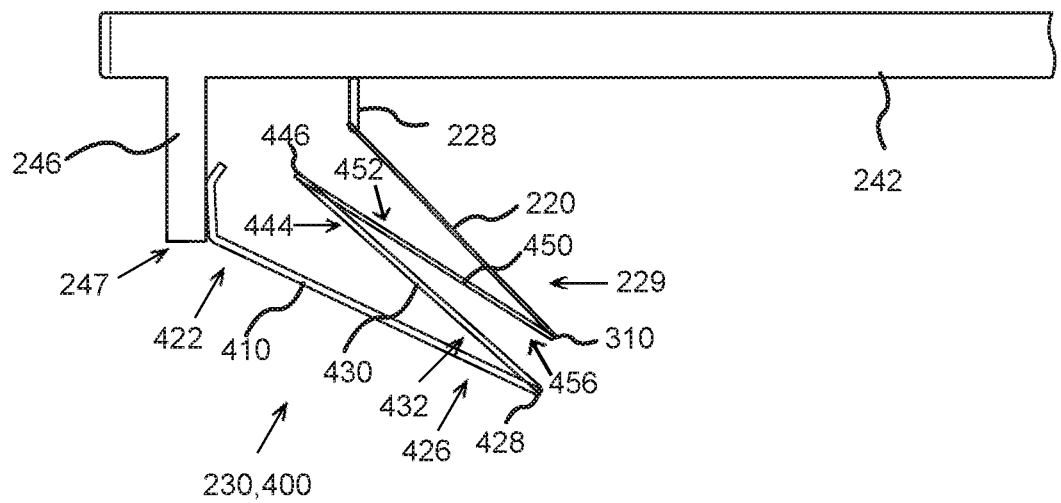
FIG. 6B illustrates a cross section of the thrust reverser in accordance with various embodiments.
Figure 6C:
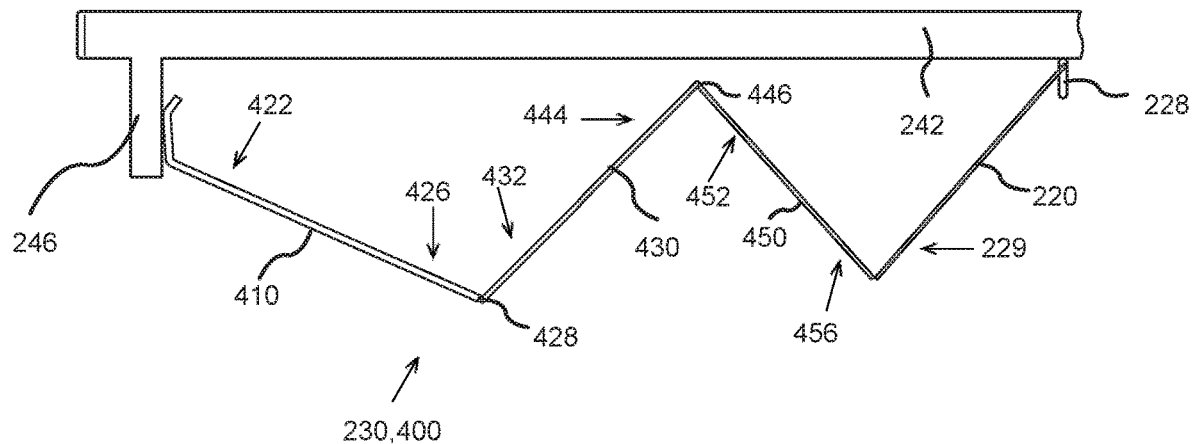
FIG. 6C illustrates a cross section of the thrust reverser in accordance with various embodiments.
Figure 6D:
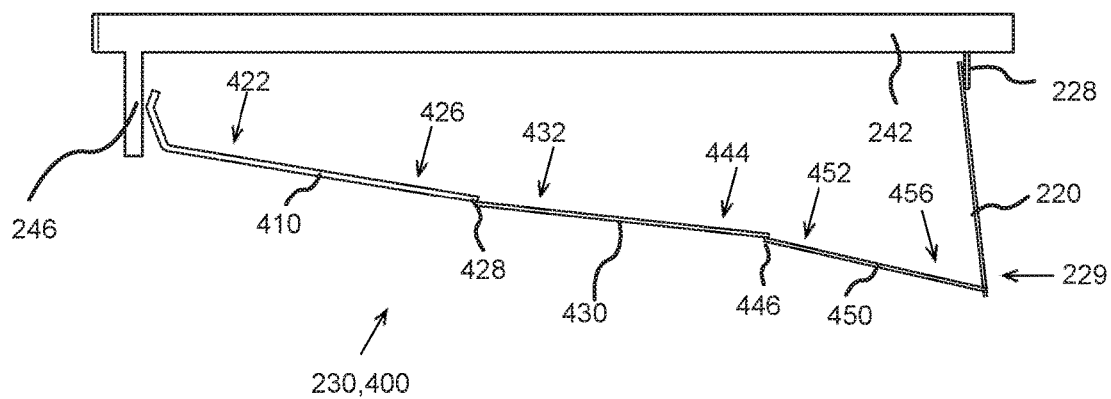
FIG. 6D illustrates a cross section of the thrust reverser in accordance with various embodiments.
Figure 7A:
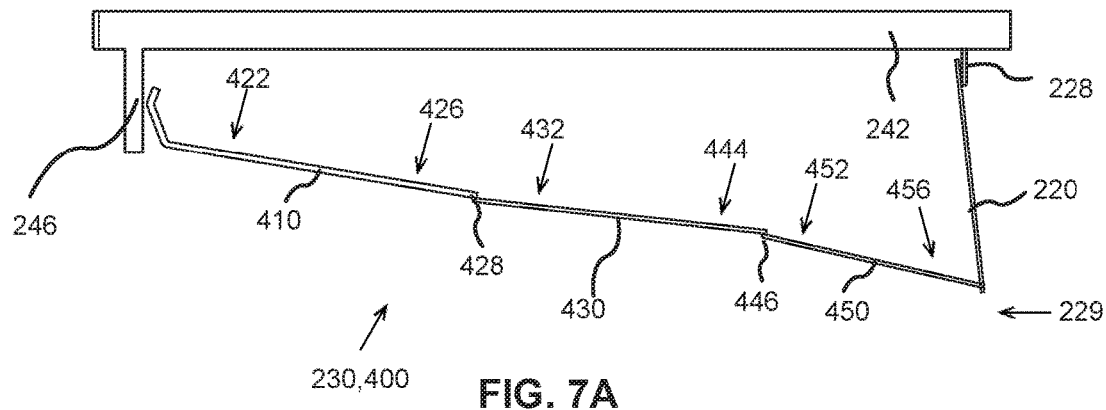
FIG. 7A illustrates a cross section of the thrust reverser in accordance with various embodiments.
Figure 7B:
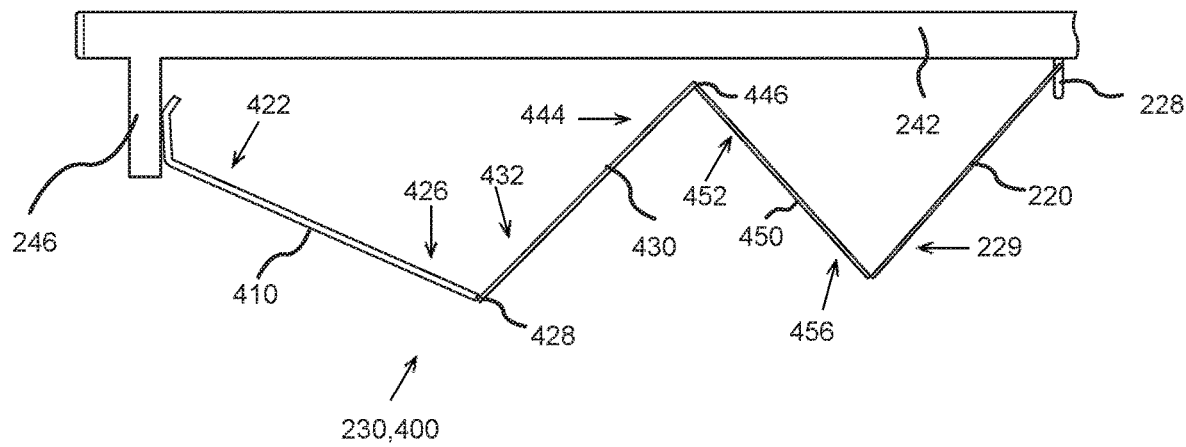
FIG. 7B illustrates a cross section of the thrust reverser in accordance with various embodiments.
Figure 7C:
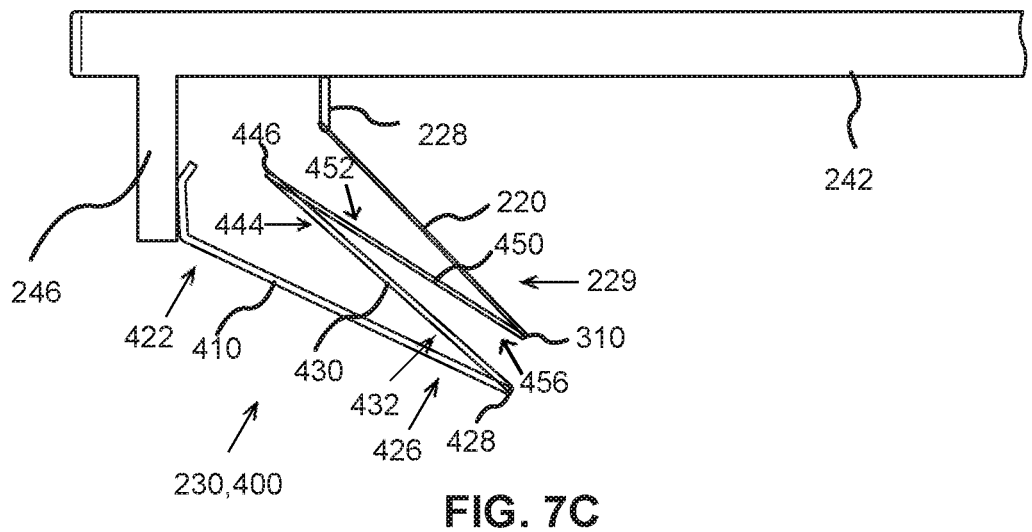
FIG. 7C illustrates a cross section of the thrust reverser in accordance with various embodiments.
Figure 7D:
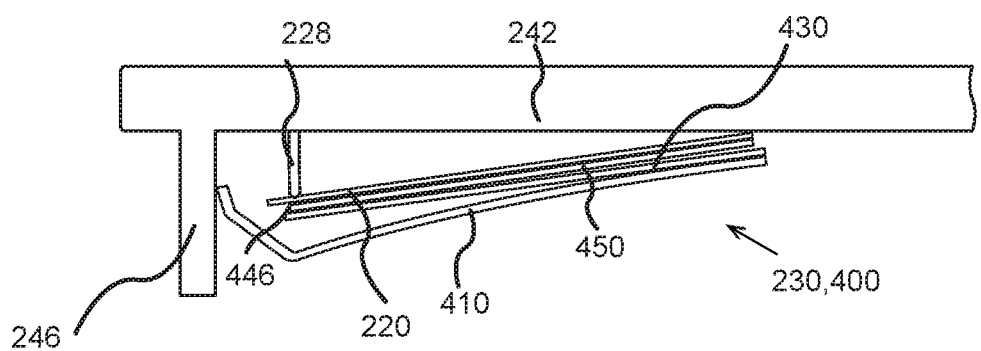
FIG. 7D illustrates a cross section of the thrust reverser in accordance with various embodiments.

Still referring to FIG. 3, FIG. 4, and FIG. 5, drag link system 400 is illustrated according to various embodiments. Drag link system 400 may comprise a plurality of segments. For example, drag link system 400 may comprise three segments. In various embodiments, drag link system 400 may comprise greater than three segments. In various embodiments, the most forward segment of drag link system 400 may be coupled to outer fixed structure 246. In various embodiments, the most aft segment of drag link system 400 may be coupled to the blocker door 220 via cross member 310. The most forward segment (e.g. first segment 410) may have the greatest width, and each successive segment may have a smaller width. For example, as shown in FIG. 4, first segment 410 has a first width W1 greater than second width W2 of second segment 430. Second width W2 is greater than third width W3 of third segment 450.

In various embodiments, drag link system 400 may comprise three segments, for example a first segment 410, a second segment 430, and a third segment 450. First segment 410 may comprise a first wall 412, a second wall 414, and a third wall 416, which is disposed between and coupled with first wall 412 and second wall 414. Third wall 416 may be disposed between and coupled with edge 418 of first wall 412 and edge 420 of second wall 414. First wall 412 and second wall 414 may be distance W1 apart. First wall 412 and second wall 414 may have a height $H_1$ from third wall 416. First end 422 of first segment 410 may comprise a curved profile and may be pivotably coupled to outer fixed structure 246 via a hinge connected via apertures 424. Outer fixed structure 246 may be a torque box or bullnose structure.

Second segment 430 may comprise a first wall 434, a second wall 436, and a third wall 438 disposed between and coupled with first wall 434 and second wall 436. Third wall 438 may be disposed between and coupled with first edge 440 of first wall 434 and first edge 442 of second wall 436. First wall 434 and second wall 436 may be distance W2 apart. Second end 444 of second segment 430 may be pivotably coupled to first end 452 of third segment 450.

Drag link system 230 may comprise third segment 450. Third segment 450 may comprise first wall 454. First wall 454 may be W3 in width. Second end 456 of third segment 450 may be pivotably coupled with cross member 310 of blocker door 220 at aft end 229 of blocker door 220.

With reference to FIG. 4, second end 426 of first segment 410 may be pivotably coupled to first end 432 of second segment 430 at via first torsional spring 428. First end 432 of second segment 430 may pivot such that first edge 440 of first wall 434 and first edge 442 of second wall 436 may rotate towards or away from third wall 416 of first segment 410. In various embodiments, W2 may be less than W1. In various embodiments, second segment 430 may pivot such that third wall 438 of second segment 430 may contact with third wall 416 of first segment 410 and be positioned between first wall 412 and second wall 414 of first segment 410. Second segment 430 may be nested 430 within first segment 410.

Second end 444 of second segment 430 and first end 452 of third segment 450 may be pivotably coupled via second torsional spring 446. First end 452 of third segment 450 may pivot such that wall 454 may rotate towards or away from third wall 438 of second segment 430. In various embodiments, W3 may be less than W2. In various embodiments, third segment 450 may pivot such that first wall 454 of third segment 450 may contact with third wall 438 of second segment 430 and be positioned between first wall 434 and second wall 436 of second segment 430. Third segment 450 may be nested 430 within second segment 410.

In various embodiments and with reference to FIGS. 2 and 3 thrust reverser system 200 may be in the stowed position. Third segment 450 may be nested 430 within second segment 410, and second segment 430 may be nested within first segment. Blocker door 220 may be pivoted such that first wall 412 and second wall 414 of first segment 410 may be disposed between first sidewall 352 and second sidewall 354 of blocker door 220. In various embodiments, first segment 410 may be nested within blocker door 220

Referring to FIG. 5, a cross-section view of thrust reverser system 200 in a deployed position is illustrated according to various embodiments. In the deployed position, thrust reverser system 200 may apply reverse thrust to an aircraft. In various embodiments, and in response to thrust reverser system being deployed 200, translating sleeve 120 may move aft, separating from nacelle 100 along split lines 112.

Upon deployment of the thrust reverser, an actuator 248 may drive the translating sleeve 120 in the aft direction. Translating sleeve 120 may be coupled to the cascade 210. Translating sleeve 120 is shown in a deployed state in FIG. 5 and in a stowed state in FIG. 2. In response to cascade 210 deploying, drag link system 230 applies a force to blocker door 220, causing a portion of blocker door 200 to pivot towards IFS 244, as shown in FIG. 5.

The translating components of nacelle 100 may translate forward and aft relative to nacelle 100 in a track and slider mechanism. Blocker door 220 may be coupled to pressure shell 243 at hinge 228. Hinge 228 may be a coupling of the pressure shell with blocker door 220 at aperture 318 and aperture 322 of blocker door. Blocker door 220 may pivot about its forward end 226 at hinge 228. In various embodiments, blocker door 220 may be referred to as a revolute mechanism, as relative movement of blocker door 220 may be limited to rotation about hinge 228, which is coupled to pressure shell 243.

In various embodiments and with reference to FIG. 6A-FIG. 6D, translating sleeve 120 may move from a stowed state (see FIG. 2) to a deployed state (see FIG. 5), and translating sleeve 120 may be "deploying." In various embodiments, as translating sleeve 120 moves aft, second segment 430 and third segment 450 of drag link system 230 may move aft. Drag link system 230, 400 and blocker door 220 each have a fixed length, and blocker door 220 may be limited to rotation about hinge 228. While deploying, segment 410 may comprise a curved profile between first end 422 and second end 426. First segment 410 may exert a force on first end 432 of second segment 430. Second end 426 of first segment 410 may contact first end 432 of second segment 430 and cause second end 444 of second segment 430 to exert a force upon joining wall 356 of trench 350, causing a cranking action that assists the pivoting motion of blocker door 220. First segment 410 may contact end 247 of outer fixed structure 246 and allow the second segment 230 to pivot toward bypass duct 240. As second segment 430 and third segment 450 move aft, drag link system 230, 400 rotates and drives aft portion 229 of blocker door 220 into the bypass duct 240. In various embodiments, first end 432 of second segment 430 may pivot about first torsional spring 428 in a clockwise direction relative to second end 426 of first segment 410. In various embodiments, first end 452 of third segment 450 may pivot about second torsional spring 446 in a counterclockwise direction relative to second end 444 of second segment 430. In various embodiments, aft end 229 of blocker door 220 may pivot about cross member 310 in a clockwise direction relative to second end 456 of third segment 350. Blocker door 220 may then divert air from the bypass duct 240 through cascade 210.

In various embodiments and with reference to FIG. 7A-FIG. 7D, translating sleeve 120 may return to a stowed state from a deployed state (translating sleeve 120 may be "stowing"). In various embodiments, as translating sleeve 120 moves forward, second segment 430 and third segment 450 of drag link system 230 may move forward. Drag link system 230, 400 and blocker door 220 each have a fixed length, and blocker door 220 may be limited to rotation about hinge 228. As second segment 430 and third segment 450 move forward, drag link system 230, 400 rotates and drives aft portion 229 of blocker door 220 towards pressure shell 243. In various embodiments, first end 452 of third segment 450 may pivot about second torsional spring 446 in a clockwise direction relative to second end 444 of second segment 430. In various embodiments, first end 432 of second segment 430 may pivot about first torsional spring 428 in a counterclockwise direction relative to second end 426 of first segment 410. In various embodiments, aft end 229 of blocker door 220 may pivot about cross member 310 in a counterclockwise direction relative to second end 456 of third segment 350.

Figure 8:
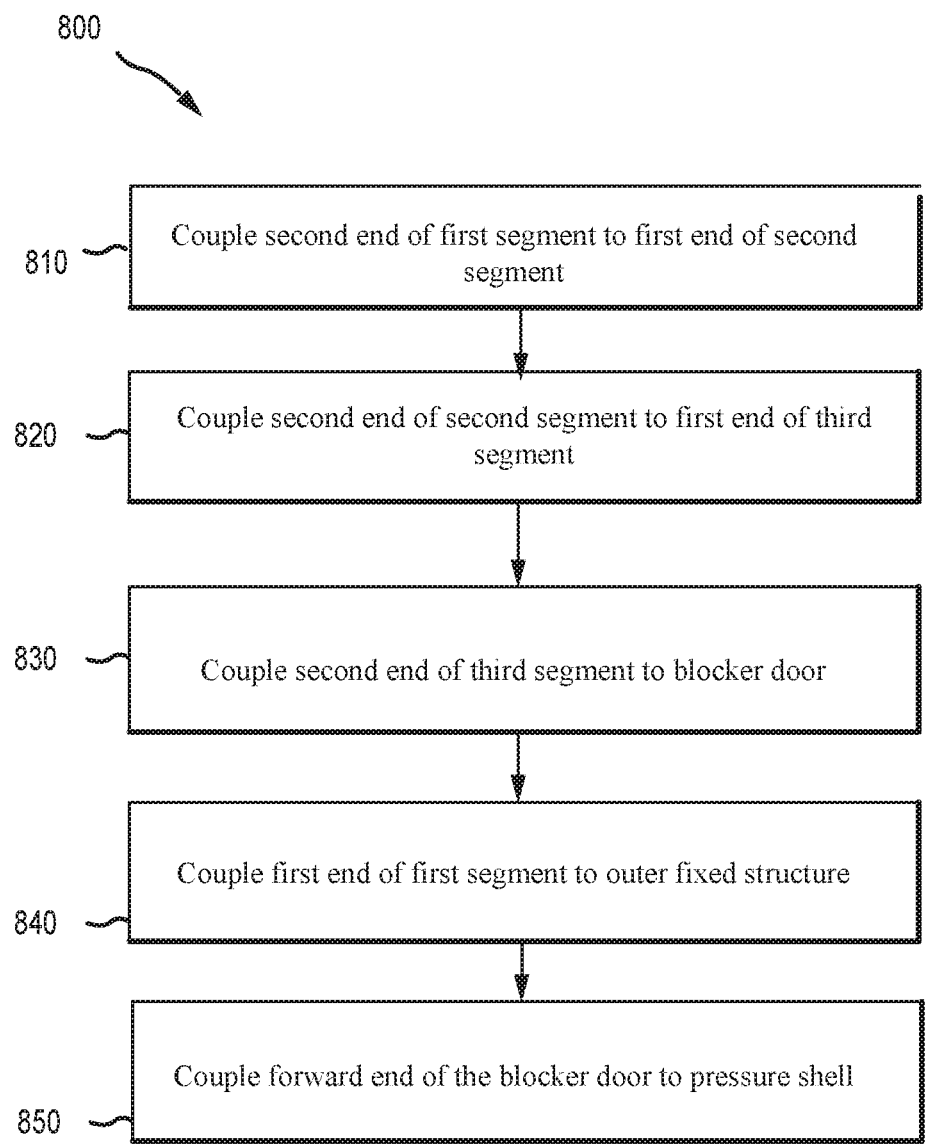
FIG. 8 illustrates a flow diagram of a process for manufacturing a drag link for use in a thrust reverser portion of a nacelle in accordance with various embodiments.

With reference to FIG. 8, a method of manufacturing a drag link for use in a thrust reverser portion of a nacelle 800 is shown. In various embodiments, the method comprises coupling a second end 426 of a first segment 410 to a first end 432 of a second segment 430 (Step 810). In various embodiments, the method comprises coupling a second end 444 of the second segment 430 to a first end 452 of a third segment 450 (Step 820). In various embodiments, the method comprises coupling a second end 456 of the third segment 450 to a blocker door 220 (Step 830). In various embodiments, the method comprises coupling a first end 422 of the first segment 410 to an outer fixed structure 246 (Step 840). In various embodiments, the method comprises coupling a forward end 226 of the blocker door 220 to a pressure shell 243 (Step 850).

In the detailed description herein, references to "one embodiment", "an embodiment", "various embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Benefits, other advantages, and solutions to problems have been described herein with regard to specific embodiments. Furthermore, the connecting lines shown in the various figures contained herein are intended to represent various functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the inventions. The scope of the inventions is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A thrust reverser system comprising:
a pressure shell;

a blocker door pivotably coupled to the pressure shell; and
a drag link comprising:
   a first segment pivotably coupled to a second segment, and
   a third segment pivotably coupled to the second segment and the blocker door,
   wherein the second segment is configured for nesting within the first segment and the third segment is configured for nesting within the second segment when the blocker door is in a stowed position.

2. The thrust reverser system of claim 1, wherein a first end of the second segment is coupled with a second end of the first segment, and wherein a second end of the second segment is coupled with a first end of the third segment.

3. The thrust reverser system of claim 1, wherein a first end of the first segment is coupled to an outer fixed structure of the thrust reverser system.

4. The thrust reverser system of claim 1, wherein the first segment comprises a first width greater than a second width of the second segment.

5. The thrust reverser system of claim 4, wherein the second width of the second segment is greater than a third width of the third segment.

6. The thrust reverser system of claim 1, wherein a second end of the third segment is coupled to an aft end of the blocker door.

7. The thrust reverser system of claim 1, wherein the blocker door comprises a trench defined at least partially by a first sidewall, a second sidewall, and a joining wall disposed between the first sidewall and second sidewall.

8. The thrust reverser system of claim 1, wherein the first segment and the second segment are coupled via a first torsional spring.

9. The thrust reverser system of claim 1, wherein the second segment and the third segment are coupled via a second torsional spring.

10. A nacelle having a thrust reverser comprising:
a pressure shell;
a blocker door pivotably coupled to the pressure shell; and
a drag link comprising:
   a first segment pivotably coupled to a second segment, and
   a third segment pivotably coupled to the second segment and the blocker door,
   wherein the second segment is configured for nesting within the first segment and the third segment is configured for nesting within the second segment when the blocker door is in a stowed position.

11. The nacelle of claim 10, wherein a first end of the second segment is coupled with a second end of the first segment, and wherein a second end of the second segment is coupled with a first end of the third segment.

12. The nacelle of claim 10, wherein a first end of the first segment is coupled to an outer fixed structure of the thrust reverser.

13. The nacelle of claim 10, wherein the first segment comprises a first width greater than a second width of the second segment.

14. The nacelle of claim 13, wherein the second width of the second segment is greater than a third width of the third segment.

15. The nacelle of claim 10, wherein a second of the third segment is coupled to an aft end the blocker door.

16. The nacelle of claim 10, wherein the blocker door comprises a trench defined at least partially by a first sidewall, a second sidewall, and a joining wall disposed between the first sidewall and second sidewall.

17. The nacelle of claim 10, wherein the first segment and the second segment are coupled via a first torsional spring, and wherein the second and the third segment are coupled via a second torsional spring.

18. A method of manufacturing a drag link for use in a thrust reverser of a nacelle, the method comprising,
coupling a second end of a first segment pivotably to a first end of a second segment,
coupling a second end of the second segment pivotably to a first end of a third segment,
coupling a second end of the third segment pivotably to a blocker door of the thrust reverser,
   wherein the second segment is configured for nesting within the first segment and the third segment is configured for nesting within the second segment when the blocker door is in a stowed position.

19. The method of claim 18, further comprising coupling a first end of the first segment to an outer fixed structure.

20. The method of claim 18, further comprising coupling a forward end of the blocker door to a pressure shell.

\* \* \* \* \*